Z. OLSSON.
APPARATUS FOR ASCERTAINING THE FUSING TEMPERATURE OF MATERIALS.
APPLICATION FILED OCT. 19, 1918.

1,314,422.

Patented Aug. 26, 1919.
2 SHEETS—SHEET 1.

WITNESSES

INVENTOR
Zacharias Olsson.
BY
ATTORNEYS

Z. OLSSON.
APPARATUS FOR ASCERTAINING THE FUSING TEMPERATURE OF MATERIALS.
APPLICATION FILED OCT. 19, 1918.
1,314,422.
Patented Aug. 26, 1919.
2 SHEETS—SHEET 2.
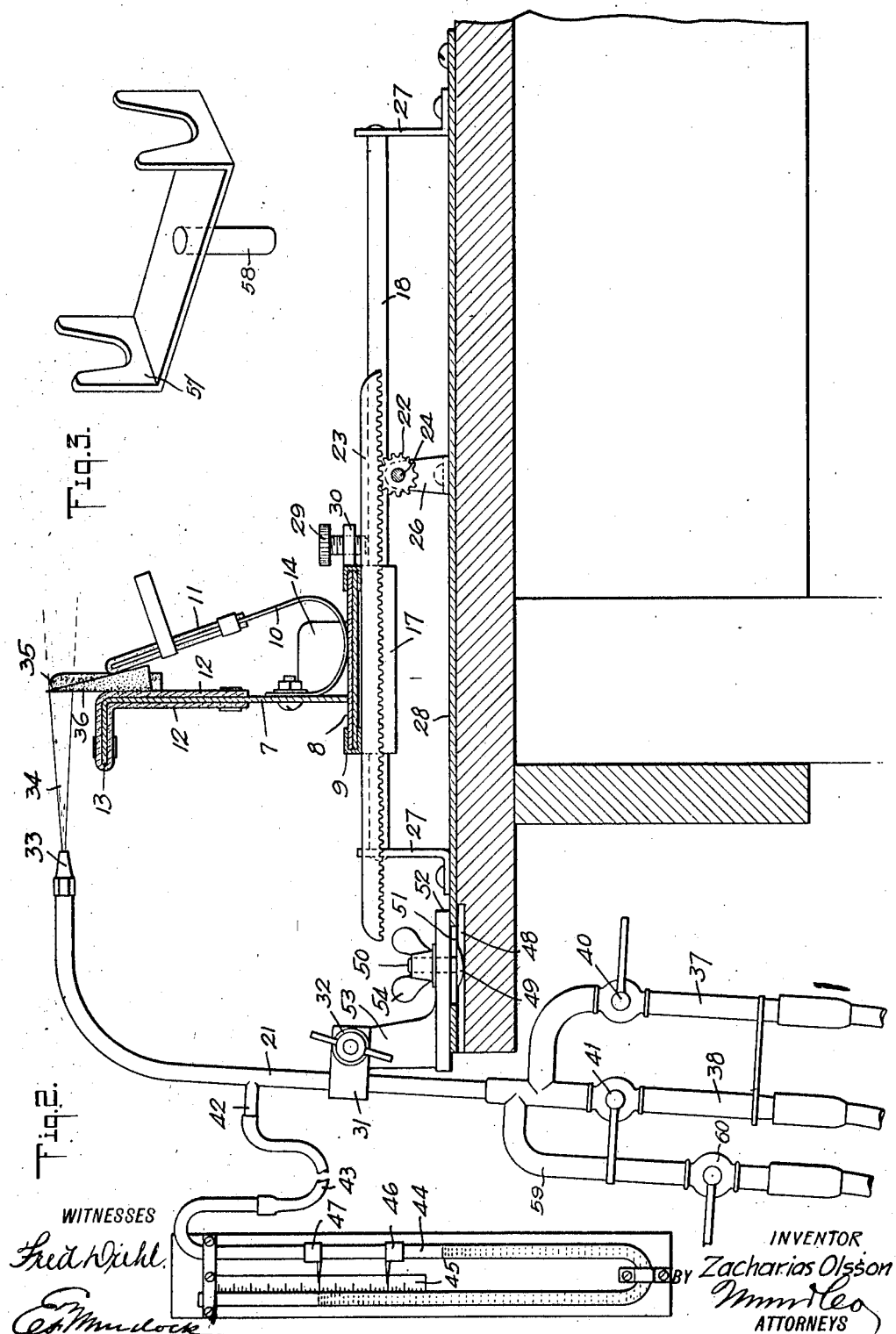

UNITED STATES PATENT OFFICE.

ZACHARIAS OLSSON, OF BROOKLYN, NEW YORK.

APPARATUS FOR ASCERTAINING THE FUSING TEMPERATURE OF MATERIALS.

1,314,422. Specification of Letters Patent. Patented Aug. 26, 1919.

Application filed October 19, 1918. Serial No. 258,778.

*To all whom it may concern:*

Be it known that I, ZACHARIAS OLSSON, a subject of the King of Sweden, and a resident of the city of New York, borough of Brooklyn, in the county of Kings and State of New York, have invented a new and Improved Apparatus for Ascertaining the Fusing Temperature of Materials, of which the following is a full, clear, and exact description.

Among the principal objects which the present invention has in view are: to provide means for accurately measuring the heat conditions of substances; to provide means for standardizing the heat conditions for repetition thereof; to provide a visible scale for the repetition of heating conditions for materials; and to save time and expense when ascertaining the fusing or other heat conditions of articles.

Drawings.

Fig. 2 is a longitudinal section, the section being taken as on the line 2—2 in Fig. 1;

Fig. 3 is a perspective view of a holder for testing a specimen to ascertain the deformation or bearing moment.

Figure 1:
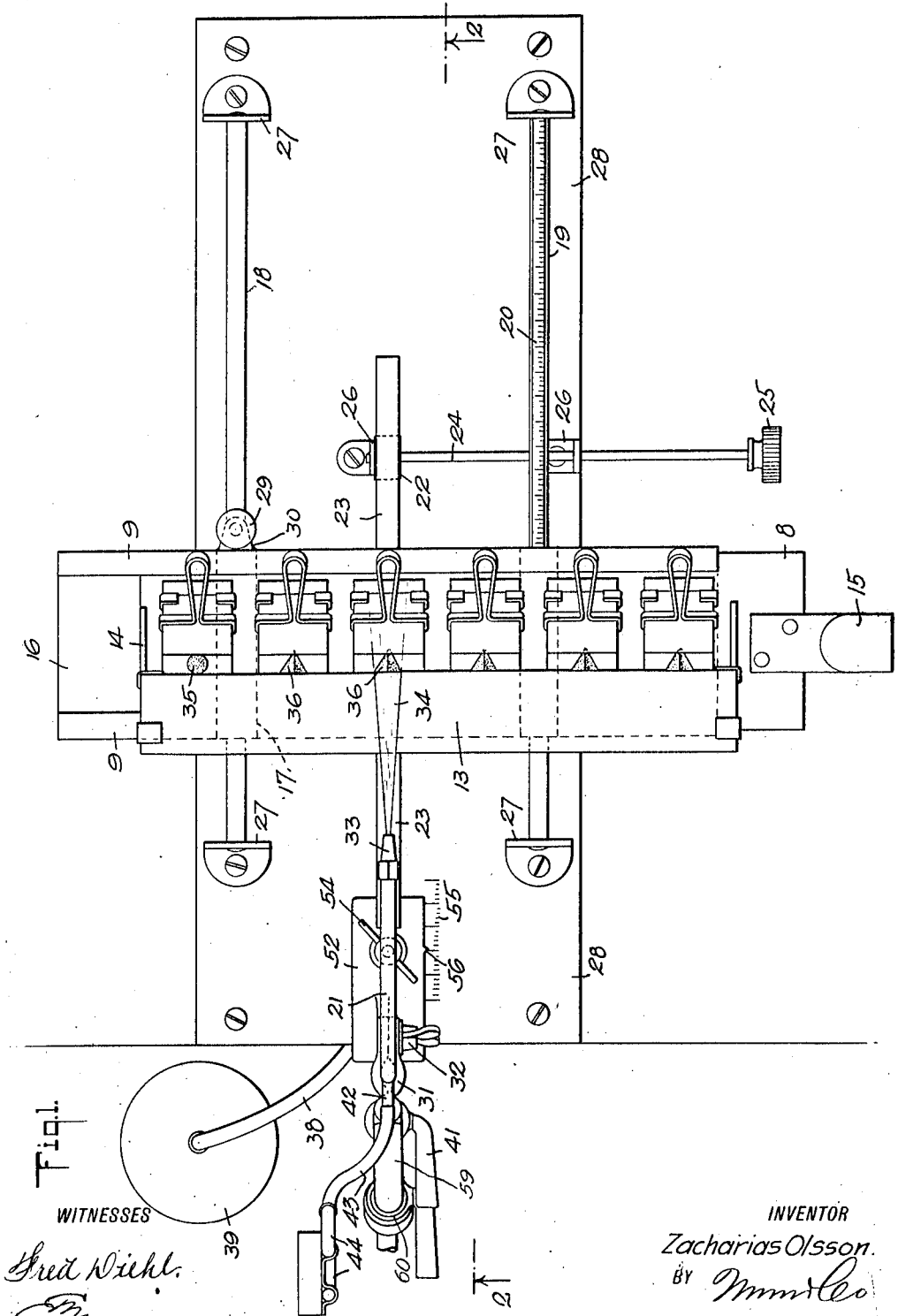
Figure 1 is a plan view of an apparatus of the character mentioned constructed and arranged in accordance with the present invention.

Description.

The apparatus herein disclosed is particularly useful for ascertaining the deformation temperature and fusing point of clays, other minerals and metals. These determinations have heretofore usually been made in electric furnaces and the temperatures either compared with Seger cones or directly ascertained by pyrometers. Both methods, however, are cumbersome, slow and not very accurate, because of the difficulty in observing the starting moment of deformation and fusing.

These difficulties and objections are overcome when using the improved apparatus herein described, where the specimen being tested is under close and continuous observation until the temperature is reached at which the physical condition of the specimen changes. The adjustment of the apparatus necessary to reach this particular temperature is at the same time mechanically recorded.

As different temperatures require different adjustments and as all these adjustments are recorded, it naturally follows that once a complete heat scale is established, Seger cones and pyrometers will be superfluous.

To this end, a bench plate 7 is mounted on a slide plate 8 within guides formed in the channel edge bars 9. Suitably attached to the plate 7 are spring clips 10, the free ends whereof are provided with a heat protecting cover 11. The free ends of the clips 10 normally rest upon the coating 12, with which the upper section of the plate 7 is provided. The coating 12 and the edge section of the plate 7 are bent as shown in the drawings, to form a platform 13. The platform 13 is employed to receive any heated articles which may fall or be thrown from the specimen being tested.

The side plate 8 is furnished with a stock flange 14 and a handle 15, by means of the latter of which the plate 8 is moved at will on the bottom plate of the carriage 16. The carriage 16 has supporting sleeves 17, which infold the side bars 18 and 19. As shown best in Fig. 2, the bar 19 is provided with calibrations forming a scale 20. The end of the sleeve 17 through which the bar 19 extends registers with and can be read upon the scale 20.

The carriage is moved toward and away from the stand pipe 21, by the pinion 22 and the rack 23, with the teeth of which said pinion engages. The pinion 22 is mounted on a shaft 24, the outer end whereof has a knurled head 25, which the operator engages for rotating said shaft and pinion. The shaft 24 has bearings in standards 26. The standards 26 supporting the said shaft and the standards 27 supporting the side bars 18 and 19, are rigidly secured upon a base plate 28.

The carriage 16 is held in any fixed position by the binding screw 29, the end whereof engages the top of the side bar 18. The screw 29 is normally supported by a lug 30, the threads of a tapped perforation wherein engage the said screw.

The stand pipe 21 is supported by a clamp 31. The clamp 31 has closing jaws which are shut upon the stand pipe by a wing nut. The clamp 31 is employed to permit the vertical adjustment of the stand pipe 21. The vertical adjustment referred to is desired to enable the nipple 33 to throw the flame jets 34 upon the specimen 35 or upon the Seger cones 36, when the Seger cones are employed in the apparatus. The stand pipe 21 is bent, as shown best in Fig. 2 of the drawings, and is connected by means of the branch pipes 37 and 38, with a gas supply of approved character and with a supply of oxygen, such as the tank 39. The supplies of gas and oxygen delivered to the stand pipe 21 and nipple 33, are controlled by means of the valves 40 and 41, respectively.

Intermediate the nipple 33 and the valves 40 and 41, the stand pipe 21 has a branch 42. The branch 42 is connected by any suitable means, such as the flexible pipe 43, with a pressure gage 44. The gage may be of any approved type, that shown in the drawings consisting of an open ended, upturned glass tube having water or other liquid therein, adjacent one leg of which is a calibrated scales 45, the opposite leg of the gage 44 having sliding markers 46 and 47, the former being used for recording the relatively smaller gas pressures and the latter being used for recording the relatively larger oxygen pressures.

The apparatus is suitably mounted on a bench or work table, the base plate 28 being secured in position thereon, and provision, such as a routing space 48 being provided for the run of a head 49 on a clamp screw 50. The screw 50 extends through an elongated slot 51 in the base plate 28, which guides the movement of the foot 52 with which the standard 53 is provided. A wing nut 54 engages the screw 50 and is manipulated to clamp the foot 52 in fixed relation to the base plate 28, and to the scales 55 with which said plate is provided, adjacent the path of movement of the said foot, as seen best in Fig. 1 of the drawings. At the side of the foot 52, a pointer 56 is provided for reading the scales 55, as determining the working position of the stand pipe 21 in its relation to the base plate 28 and parts connected therewith.

When provided with an apparatus constructed and arranged as shown in the accompanying drawings, and as above described, the operator opens one of the clips 10, to place between the plate 7 and the end of the clip, a specimen, such as indicated by the numeral 35, which specimen is to be tested. The carriage 16 is run back by rotating the shaft 24 and pinion 22 thereon. If Seger cones are to be used for verification, these are preferably disposed within the grip of the remaining clips 10, substantially as shown in Fig. 1 of the drawings.

The valve 40 is manipulated to provide a flow of gas, which is lighted at the nipple 33. The pressure of the gas will be reflected in the gage 44, one column of the liquid being depressed by the pressure elevating the opposite column, the difference being read as on the scales 45. The pressure of the gas having been ascertained, the marker 46 is moved to register the position of the rising column on the scale 45.

The gas flame having been established, the operator now turns the valve 41 to admit oxygen to the stand pipe 21 and nipple 33. The added pressure of the oxygen will now affect the gage 44, so that a higher reading will be obtained on the scale 45. The marker 47 is now adjusted to record the higher measurement. The scale 45 may now be read for both pressures, the marker 46 indicating the gas pressure, the marker 47 indicating the oxygen pressure, said gas pressure being deducted from the total indicated by the marker 47. The carriage 16 is now moved to bring the specimen 35 into said jet. This movement is continued until a position is reached where the intensity of the jet begins to fuse the specimen.

It is obvious that the record may now be kept, so that the test may be accurately repeated as the scales 20, 45 and 55 may be employed for duplicating the conditions under which the original test was made.

If it is desired to verify the measurement ascertained through the use of the said scales, the use of the Seger cones 36 may be resorted to. These when placed in the clips 10 are successively exposed to the jet 34, the carriage 16 remaining fixed in the position where the specimen was fused. When one of the Seger cones is fused, the standard reading of the said cone is then compared with the reading of the present apparatus, which, as stated, is determined as the result of conditions ascertained on the various scales. The scales 55 is employed principally for correcting variation in the heat units of different known gas supplies. When the gas has a relatively low heating factor, the stand pipe 21 is advanced on the base plate 28. When the heating factor of the gas is high, the stand pipe is moved in the opposite direction. The ascertained position of the stand pipe can be read on the scales 55.

From the foregoing, it is evident that a chemist having ascertained with the apparatus described, the fusing points as indicated by the various scales, may transmit to a distant chemist the conditions under which he worked so that the distant chemist may verify the report on any particular specimen or supply with which he is furnished.

While the foregoing has been devoted to describing the employment of the invention for the purpose of ascertaining the fusing point of articles, it is employed for ascertaining the bending moment or deformation moment.

When utilizing the invention for this purpose, a pencil specimen having a predetermined and even cross section is sustained between the upturned ends of the supporting yoke 57, shown in Fig. 3 of the drawings.

This yoke is constructed from any suitable material, and the shank 58 of the yoke 57 is held by the clips 10, so that the specimen is raised above the platform 13.

Also in the foregoing description, the operation has been outlined as one employing oxygen under pressure. The resultant flame is found too intense for some uses, as when employing the apparatus as a blow pipe. For this purpose, it is found advisable to employ atmospheric air under pressure. To this end, a branch pipe 59 is introduced which communicates with the stand pipe 21 and is controlled by a valve 60. The pressure of the air introduced from the pipe 59 to the stand pipe 21 is measured in the same manner as that above described.

*Claims.*

1. An apparatus as characterized comprising a gas burner having a contracted jet-forming nipple; a stand pipe; a flaming gas supply apparatus operatively connected with said stand pipe and embodying a controlling valve; an oxygen supply apparatus operatively connected with said stand pipe and embodying a controlling valve; means for registering the pressures of said gas and oxygen supplies; a movable carriage for holding a specimen; and means for indicating the proximation of said carriage to said burner.

2. An apparatus as characterized comprising a gas burner having a contracted jet-forming nipple; a stand pipe; a flaming gas supply apparatus operatively connected with said stand pipe and embodying a controlling valve; an oxygen supply apparatus operatively connected with said stand pipe and embodying a controlling valve; means for registering the pressures of said gas and oxygen supplies; a movable carriage for holding a specimen; and means for indicating the proximation of said carriage to said burner, said means embodying a calibrated scale for indicating the position of said carriage.

3. An apparatus as characterized comprising a fixed jet-forming gas burner; a carriage movable to and from said gas burner; means for recording the proximation of said carriage to said burner, said means embodying a scale readable in conjunction with said carriage; and a holder for a specimen being tested, said holder being slidable on said carriage transverse the path of movement of said carriage.

4. An apparatus as characterized comprising a fixed jet-forming gas burner; a carriage movable to and from said gas burner; means for recording the proximation of said carriage to said burner, said means embodying a scale readable in conjunction with said carriage; a holder for a specimen being tested, said holder being slidable on said carriage transverse the path of movement of said carriage; and a plurality of spring closed clips mounted on said holder for retaining in operative position, a plurality of specimens to be tested by said burner.

ZACHARIAS OLSSON.

Copies of this patent may be obtained for five cents each, by addressing the "Commissioner of Patents, Washington, D. C."